US012565973B2

(12) United States Patent
Nichols et al.

(10) Patent No.: US 12,565,973 B2
(45) Date of Patent: Mar. 3, 2026

(54) GOBO FROSTED OR ETCHED USING A PICO-SECOND OR FEMTO-SECOND LASER

(71) Applicant: Avid Labs, LLC, Fort Wayne, IN (US)

(72) Inventors: Joel A. Nichols, Columbia City, IN (US); Benjamin Powers, Fort Wayne, IN (US); Samuel Morrison, Fort Wayne, IN (US)

( * ) Notice: Subject to any disclaimer, the term of this patent is extended or adjusted under 35 U.S.C. 154(b) by 0 days.

(21) Appl. No.: 19/073,370

(22) Filed: Mar. 7, 2025

(65) Prior Publication Data

US 2025/0216044 A1 Jul. 3, 2025

Related U.S. Application Data

(63) Continuation-in-part of application No. 18/493,251, filed on Oct. 24, 2023, now Pat. No. 12,276,400.

(51) Int. Cl.
| | |
|---|---|
| *F21S 10/00* | (2006.01) |
| *B23K 26/0622* | (2014.01) |
| *B23K 26/362* | (2014.01) |
| *F21V 1/20* | (2006.01) |
| *F21V 3/04* | (2018.01) |
| *B23K 103/00* | (2006.01) |

(52) U.S. Cl.
CPC ........ *F21S 10/007* (2013.01); *B23K 26/0624* (2015.10); *B23K 26/362* (2013.01); *F21V 1/20* (2013.01); *F21V 3/049* (2013.01); *B23K 2103/54* (2018.08)

(58) Field of Classification Search
CPC .... F21V 3/049; F21V 1/20; F21V 1/22; F21S 10/007
See application file for complete search history.

(56) References Cited

U.S. PATENT DOCUMENTS

| | | | |
|---|---|---|---|
| 8,314,919 | B2 | 11/2012 | Ikeda |
| 9,222,753 | B2 | 12/2015 | Hornung et al. |
| 10,480,732 | B2 | 11/2019 | Nichols |
| 10,901,279 | B2 | 1/2021 | Zhang et al. |
| 2015/0168612 | A1 | 6/2015 | Lee |
| 2022/0113455 | A1 | 4/2022 | Hawkins |

(Continued)

FOREIGN PATENT DOCUMENTS

| | | |
|---|---|---|
| EP | 3362219 B1 | 8/2022 |
| JP | 2013066899 A | 4/2013 |

(Continued)

OTHER PUBLICATIONS

JnstarLaserPeter;Jan. 1, 2020; Jnstar Laser Peter; How to Make a Gobo, Gobo Making Laser Machine; Retrieved From: https://www.youtube.com/watch?v=oJqbJmmW1zs 2:35—4:40 Video.

(Continued)

*Primary Examiner* — Sean P Gramling

(57) ABSTRACT

A gobo used to project an image by selectively transmitting and blocking light includes a blank made of transparent material. There is an etched or frosted area on the surface of the blank having a surface morphology characterized by micro-pyramids, which may be produced using a pico-second or femto-second laser. The micro-pyramids cause micro-lensing to occur when the gobo is in use, thereby rendering the etched or frosted area fully opaque and cause the gobo to produce a sharp projected image.

20 Claims, 6 Drawing Sheets

(56) References Cited

U.S. PATENT DOCUMENTS

2022/0170601 A1 * 6/2022 Vissenberg ............. F21V 3/049
2023/0273641 A1 8/2023 Vink et al.

FOREIGN PATENT DOCUMENTS

WO WO2009006747 1/2009
WO WO2012092028 7/2012

OTHER PUBLICATIONS

Amazon; May 24, 2024; Jnstar; Jnstar Laser Laser GOBO Lens
Engraving Machine 20w Laser Glass GOBO Engraving Machine
Retrieved From: https://www.amazon.com/Jnstar-Laser-Engraving-
Machine-Glass/dp/B0852VKLYG.
https://www.mdpi.com/2076-3417/9/8/1554 (MDPI).
https://www.photonics.com/Articles/Short-Pulse_Lasers_Enable_
Transparent_Materials/a56800 (Photonics Spectra).
https://www.researchgate.net/profile/Sudhirkumar-Munishwar/
publication/330298662/figure/fig5/
AS:819725189775361@1572449123729/a-Linear-absorption-spectra-
of-sodium-borosilic-glasses-and-b-glass-ceramics.png (Munishwar).
https://www.nktphotonics.com/applications/medical-life-science/
laser-micromachining-of-glass/ (NKT Photonics).
https://lps-works.com/laserjobshop/paper_lps_20190215/ (LPS Works).
https://www.trumpf.com/en_US/products/lasers/marking-lasers/
trumicro-mark/ (Trumpf).

* cited by examiner

GOBO FROSTED OR ETCHED USING A PICO-SECOND OR FEMTO-SECOND LASER

FIELD OF INVENTION

The present invention relates to projection, illumination and lighting, including but not limited to artistic lighting systems for creating or enhancing a particular mood and artistic effects creation using a gobo.

BACKGROUND

A gobo is pattern or stencil placed inside or in front of a light source to control the shape of the emitted light and its shadow, typically to project an image. For studio photography purposes, the term "gobo" has come to refer to any device that casts a shadow, and various pieces of equipment that go in front of a light (such as a gobo arm or gobo body). In theatrical lighting, however, the term more specifically refers to a device placed in 'the gate' or at the 'point of focus' between the light source, called a lamp, and the lenses (or other optics). This placement is important because it allows a pattern with crisp, sharp edges to be projected onto a surface on the stage.

Gobos are used in theatres, television studios, concert venues, theme parks, nightclubs, retail premises, offices, exhibition halls, and other venues. Gobos may be manufactured from a range of materials, such as metal, glass or plastic and are typically produced in a range of standard sizes and patterns designed to fit common luminaires so that they are easily inserted and removed in the luminaire. They are often used with stage lighting instruments to manipulate the shape of the light that is cast over a space or object. A metal gobo with patterned holes allows only the desired shape or pattern of light through, casting a specific pattern of light and shadow into the space. In a side industry car companies have made what are known as puddle lights or lights on the underside of doors that illuminate any "puddles" on the ground after you open the doors. The automotive companies have turned these puddle lights and other areas on the vehicle into projection areas for images with gobos, usually these are the car companies' logos. This has sacrificed lighting an area in exchange for a logo.

Gobos can be made from various materials or substrates. Common types include steel or other metals, or glass and plastic or transparent gobos. Steel or other metal gobos use a metal template from which the image is cut and are generally the sturdiest of the common gobo types but often require modifications to the original design called bridging in order to display correctly. In order to correctly represent the letter "O" for example, small tabs or bridges must be made in order to keep the metal tab in the middle of the letter supported. This effect may be undesirable in more intricate patterns or designs.

Glass gobos are sometimes made from transparent glass with a partial reflective coating with a black absorbent backing to block the light and produce "black" areas in the projected image. This eliminates any need for bridging, since the glass itself is the support, and allows more intricate images to be produced. However, the fact that there is a reflective side and a black colored side means that the glass gobo with this configuration cannot be reversed in use. Glass gobos can also include colored areas, whether by a colored coating or by multiple layers of dichroic glass (one for each color) glued on an aluminum or chrome coated black and white gobo, or by varying the thickness of the dichroic coating (and therefore the color) in a controlled way on a single piece of glass, making it possible to turn a color photo into a glass gobo. Glass gobos generally offer the highest image fidelity but are the most fragile.

Plastic gobos or transparency gobos can be used in LED ellipsoidal spotlights. These "LED Only" plastic gobos can be full color like glass gobos, but without the delicate nature. In the past plastic gobos had been generally custom made for when a pattern is needed in color and glass does not suffice. However, in a "traditional" tungsten or halogen light fixture, the focus point where a gobo must be placed is usually extremely hot, so these thin plastic films generally need to be used with special cooling elements to prevent them from being melted. A lapse in the cooling apparatus, even for just a few seconds, can cause plastic gobos in a traditional lighting instrument to be ruined.

The prior art manufacturing processes for metals include chemical etching, laser cutting, steel rule die, and laser ablation to remove unwanted material. Other processes include printing ink or dichroic coating onto glass or plastic using a variety of printing processes, as mentioned previously. The previous stated methods and materials are known to create a product that has many limitations and issues. Some of these limitations and issues include breaking, cracking, warping, and overheating or inconsistent heating leading to material fatigue, and only a select limited number of materials may be used. The aforementioned processes are both time-consuming and limited in their functionality. Moreover, in some of these processes, coatings may over many years of use can degrade due to heat, such that the opaque coating flakes or lifts away.

Occasionally to create a glass gobo, laser ablation using an ultraviolet laser or photo etching techniques have been used. However, prior to the present invention, nano-second lasers have been used to ablate the areas of glass gobos meant to prevent light transmission, with substantially deficient results. Specifically, nano-second lasers remove material from glass substrate by causing very localized heating, such that the material being removed vaporizes. This vaporized glass material does not simply disappear however. Some of it does dissipate into the atmosphere. However, some of it recondenses back onto the surrounding etched glass surface as very tiny surface debris. Moreover, the localized heating recasts some of the surface micro-layer of the etched areas so that the resulting optical scattering during use of the gobo is imperfect. Even further, the heat affected zone is characterized by microcracks.

Collectively, these effects result in the areas that are supposed to be rendered opaque to light transmission in order to create the darkened areas of the light pattern produced by the gobo transmitting a small amount of light. As a result, these darkened areas are only produced as dark gray areas rather than fully black areas. Moreover, the overall image produced by the gobo is often fuzzy and indistinct. What is needed are improvements in the manufacturing process for gobos that will result in fully darkened areas of the light pattern in order to produce a sharp final image.

SUMMARY

Embodiments of the present invention concern projection, illumination, and lighting, including but not limited to lighting systems having gobos that produce sharp projected images. The gobos are made of 100% glass or similar material characterized by long life and sharp logo or image projection. No inks or coatings are used on the areas of the gobo intended to entirely prevent the transmission of light.

The areas of the gobo intended to entirely prevent the transmission of light are etched or frosted using a pico-second or femto-second laser, so that the etched or frosted areas entirely scatter the light rendering them fully opaque, while the areas that are not etched or frosted pass light cleanly therethrough. The glass or similar material may be otherwise molded, chemically treated, or subject to preliminary or secondary operations before or after the etching or frosting using the pico-second or femto-second laser. The gobos exhibit more consistent and improved heat distribution when in use.

Suitable pico-second or femto-second lasers for etching or frosting gobos in this way may include the Trumpf TruMicro Mark 1020 made by TRUMPF Inc. located at Farmington Industrial Park, Farmington, CT 06032, USA. Such pico-second or femto-second lasers may be used in the present invention to produce a surface morphology upon the glass surface of the gobo characterized by micro-pyramids that result in micro-lensing, which is believed by the present inventors to accomplish the improved light scattering and low light transmission hereby achieved. Moreover, because of the improved frosting or etching, possibly having a surface morphology characterized by micro-pyramids that result in micro-lensing, gobos etched or frosted using the pico-second or femto-second laser exhibit excellent light blocking characteristics in both directions, eliminating ghosting effects even when reversed. Furthermore, a gobo may be etched or frosted using the pico-second or femto-second laser on both sides in this way, resulting in even lower light transmission beyond the already low levels achieved by etching or frosting the gobo on one side using the pico-second or femto-second laser. The net result is projected images that are incredibly sharp and well defined.

Etching or frosting the gobo using the pico-second or femto-second laser according to the present invention accomplishes these improved results at least in part due to better ablation of materials. Specifically, "For ultrafast pulse widths, namely those at the 15-ps range and below, the laser-material interaction operates on a mechanism that is fundamentally different from the mechanism that occurs with longer pulses. Specifically, longer pulses remove material through a photothermal interaction in which material is heated up until it vaporizes. In contrast, ultrafast pulses remove material by photoablation. In this process, the high peak fluences drive multiphoton absorption, stripping electrons from the material, which explodes away because of Coulomb repulsion. Because photoablation involves directly breaking the molecular or atomic bonds that hold the material together, rather than simply heating it, it is intrinsically not a hot process."[1]

[1] *Short-Pulse Lasers Enable Transparent Materials Processing*, PHOTONICS spectra, October 2014, retrieved 28 Feb. 2025

In some embodiments, the etching or frosting of the gobo using the pico-second or femto-second laser may be combined with a four-color process using four different plates. Three of the plates of the stack of gobos would be created using known coloring processes, whereas the gobo etched or frosted using a pico-second or femto-second laser would be substituted for the mirrored, coated, or etched or frosted using a nano-second laser gobo. In this way, the gobo stack would result in fully opaque areas intended to prevent light transmission, and appropriately colored areas intended to transmit colored light, while remaining cooler. Moreover, a gobo stack manufactured in this way would be lower in cost than one that had a mirrored or coated gobo. It is further envisioned as part of the present invention that the gobo etched or frosted using a pico-second or femto-second laser would also be colored using known coloring processes, before or after the etching or frosting using the pico-second or femto-second laser.

The pico-second or femto-second laser used in the present invention to etch or frost the gobo also functions efficiently as a glass cutter due to its cold processing capability. This means the surface or surfaces of the gobo may be etched or frosted and also cut or shaped in one setup, thereby lowering labor costs. This operation can also be performed upon color plates for multicolor gobos. Moreover, the previous coating processes required very clean glass or other material during the coating process, whereas the pico-second and femto-second laser ablation process of the present invention does not require clean glass, thereby eliminating cost intensive cleaning processes during manufacture.

It is here noted that short duration lasers are known to be used to mark materials, including glass, ceramic, quartz, and even diamond. However, prior to the present invention, pico-second or femto-second lasers have not been used to etch or frost light transmitting materials, whether or not with surface morphology upon the glass surface characterized by micro-pyramids that result in micro-lensing, for the purpose of improved light scattering and low light transmission in order to prevent light transmission to create patterns in the light pattern produced.

According to one embodiment of the present invention, a gobo used to project an image by selectively transmitting and blocking light includes a blank made of transparent material. There is an etched or frosted area on the surface of the blank having a surface morphology characterized by micro-pyramids.

According to another embodiment of the present invention, a gobo apparatus includes a housing and a light source disposed within the housing. A gobo is used to project an image by selectively transmitting and blocking the light produced by the light source. The gobo includes a blank made of transparent material. There is an etched or frosted area on the surface of the blank having a surface morphology characterized by micro-pyramids.

According to yet another embodiment of the present invention, a method of manufacturing a gobo used to project an image by selectively transmitting and blocking light includes several steps. The first step is providing a blank made of transparent material. The second step is etching or frosting an area on a surface of the blank, thereby producing a surface morphology characterized by micro-pyramids.

DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplification are not to be construed as limiting the scope of the invention in any manner.

DETAILED DESCRIPTION

The following detailed description and appended drawing describe and illustrate various exemplary embodiments of the invention. The description and drawings serve to enable one skilled in the art to make and use the invention and are not intended to limit the scope of the invention in any manner. In respect of any methods disclosed and illustrated, the steps presented are exemplary in nature, and thus, the order of the steps is not necessary or critical.

As used herein, the term visible light refers to the spectrum of light which the human eye can see without the aid of some device. The term collimated light or collimated beam of light refers to parallel rays of visible light which minimally spreads as it propagates from the light source. The term focused pattern refers to a single shape or design or a grouping of shapes or designs that are projected using one or more gobos. As used herein, the phrase "in focus" means the pattern is illuminated as desired without significant blurriness.

Figure 1:
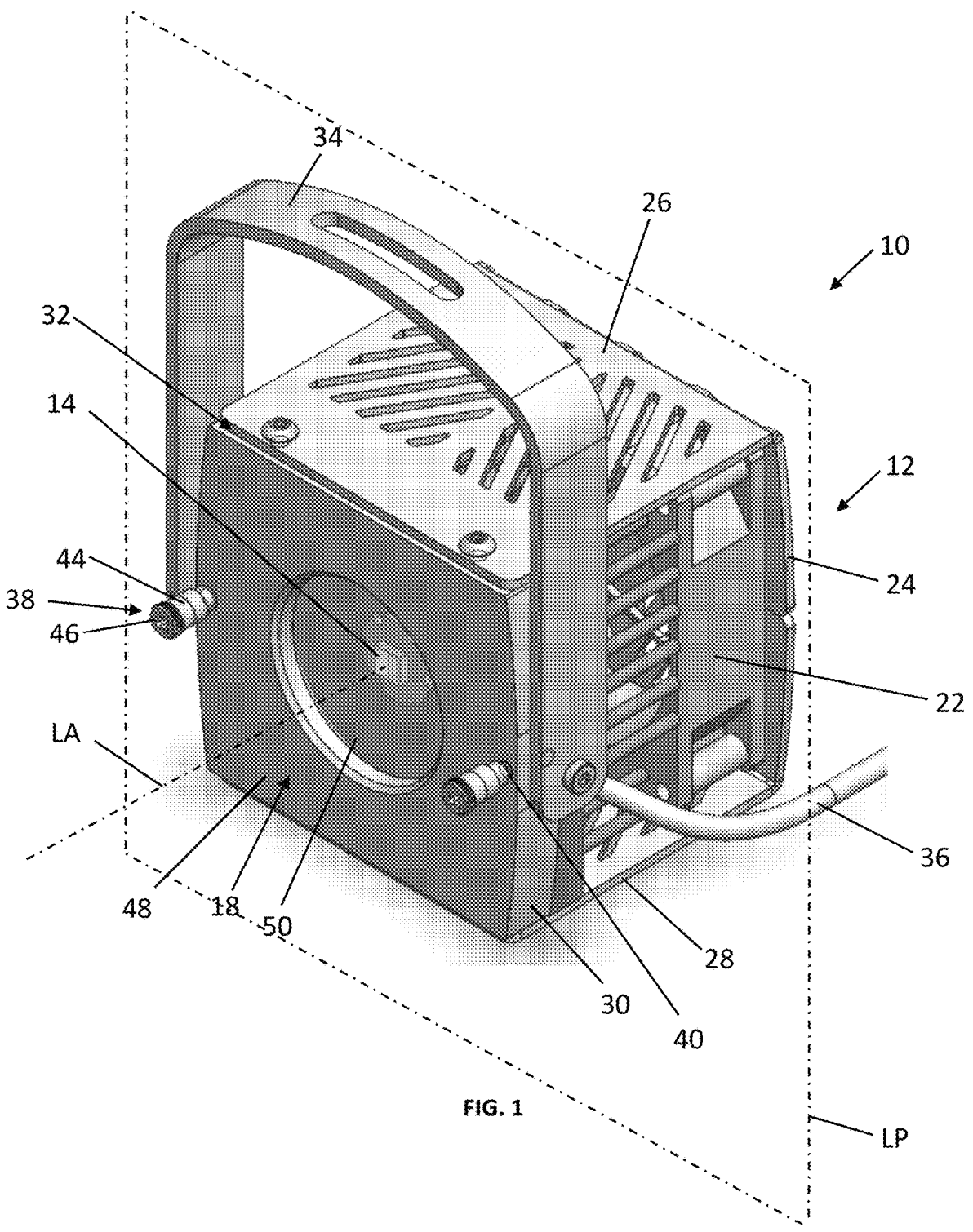
FIG. 1 is a front perspective view of an embodiment of a gobo apparatus which has a housing and an optical device.
Figure 2:
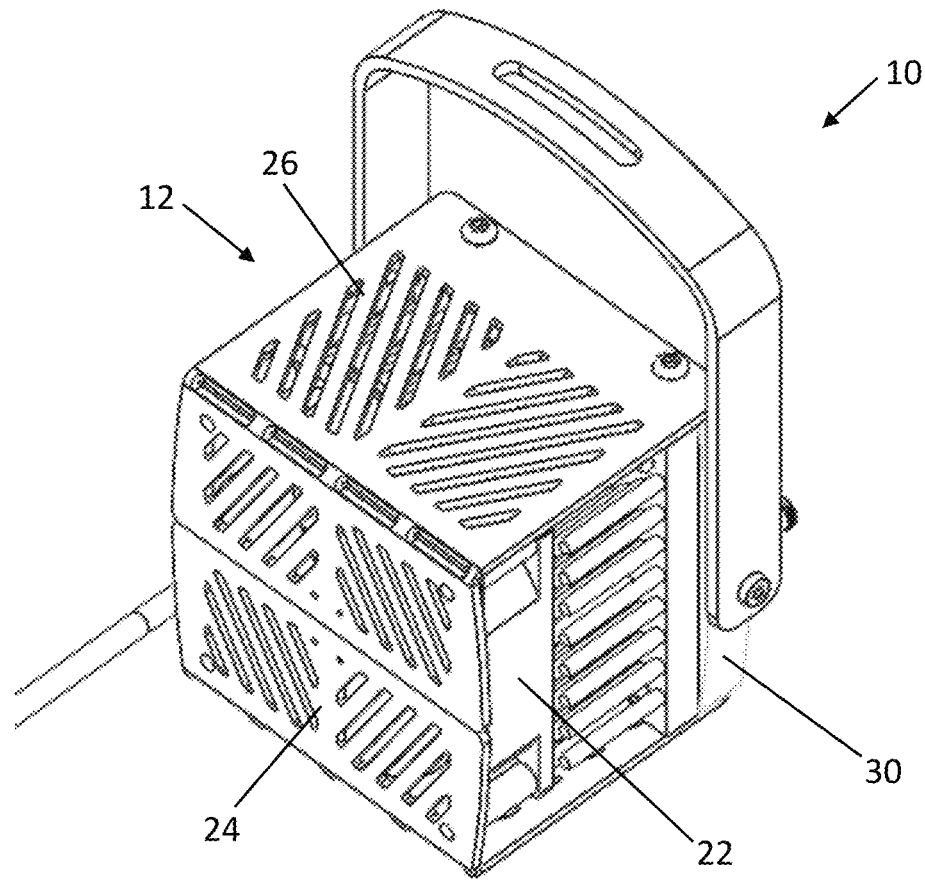
FIG. 2 is a rear perspective view of the gobo apparatus of FIG. 1.
Figure 3:
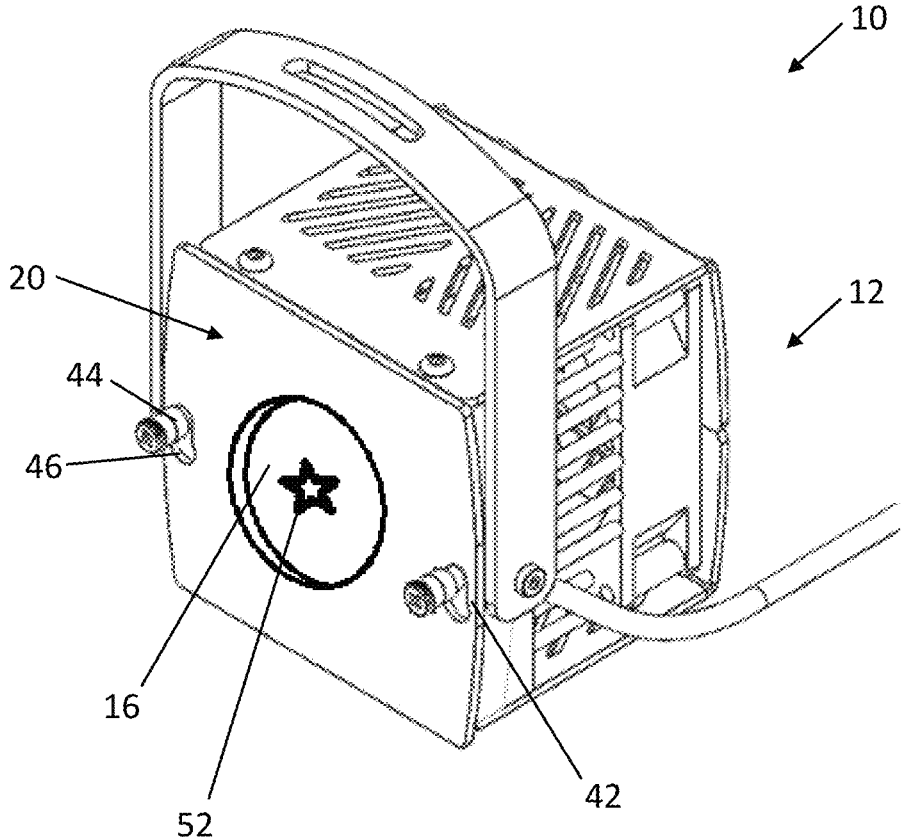
FIG. 3 is a front perspective view of the gobo apparatus of FIG. 1 having an interchangeable head, the head including a gobo for projecting a pattern.

Referring now to the drawings, and more particularly to FIGS. 1 through 3, a gobo apparatus 10 is shown. The gobo apparatus 10 generally includes a housing 12, a light source 14 disposed within the housing 12, which may be a collimated light source 14, and at least one gobo 16 removably attached to the housing 12. The gobo apparatus 10 projects a focused pattern, via the at least one gobo 16, onto a desired surface. In one embodiment, the gobo apparatus 10 further includes an interchangeable optical device 18 and/or an interchangeable head 20 upon which the at least one gobo 16 is secured. The interchangeable optical device 18 and/or head 20 allow the user to easily and efficiently switch patterns without need to change or adjust the housing, the light source, a position and/or orientation of the optical device 18 and/or the interchangeable head 20.

The housing 12 houses the light source 14 and mounts the gobo 16. The housing 12 includes an internal frame 22, a back wall 24 composed of one or more panels, top and bottom walls 26, 28, side walls 30, and an open front end 32 opposite the back wall for accommodating the head 20. The side walls 30 may or may not be open side walls to allow access to the internal frame 22 and provide additional ventilation. A handle 34 can be pivotally connected to both side walls 30 by fasteners, such as screws (unnumbered). A power cable 36 for powering the light source 14 can be attached to the internal frame 22 and extend out of the housing 12 at one of its sides. The housing 12 may or may not include a fan for cooling the light source 14 (not shown). The housing 12 may be composed of any suitable material, such as plastic and/or metal.

The housing 12 may also include mounting features 38 for dually mounting the interchangeable optical device 18 and head 20 onto the housing 12. The mounting features 38 can be rigidly or removably connected to the internal frame 22 or the side walls 30 of the housing 12. The mounting features 38 can extend forwardly beyond the side walls 30 of the housing 12. The mounting features 38 may extend through corresponding mounting features 40 in the optical device 18 and corresponding mounting features 42 in the head 20. The mounting features 38 can be in the form of protrusions, hollow stems 44, and/or fasteners 46. The protrusions can be in the form of rigid posts extending outwardly from the internal frame 22. The fasteners 46 can be in the form of pegs or screws that connect to corresponding receiving holes in the internal frame 22. Additionally, each fastener 46 can extend through a hollow stem or sleeve 44 that directly contacts each respective mounting feature 40, 42 of the optical device 18 and the head 20. Each stem 44 can be two-tiered having a first annular portion and a second annular portion with a diameter that is less than the diameter of the first portion. The first and second annular portions of the stem 44 can correspond in size and shape of the mounting features 40, 42 of the optical device 18 and the head 20.

The light source 14 is configured to emit light, which may or may not be collimated light. The light source 14 can be mounted on a designated mount or head which in turn is connected to the internal frame 22. The light source 14 defines a light source axis LA which extends axially from a center point of the light source 14. The light source axis LA can be coaxial with a centerline of the housing 12. The light source 14 also defines a light source plane LP, which is the plane in which the light source 14 resides. The light source plane LP can be parallel to the rear wall 24 of the housing 12. The light source 14 can be in the form of a laser-based light-emitting diode (LED). Alternatively, the light source 14 can be configured as a laser, an incandescent light, or a radiation source such as an IR or UV light source for emitting non-visible light. The light source may or may not include a designated collimator for collimating the light emanating from the light.

The optical device 18 is removably connected to the housing by the mounting features 38 of the housing 12. The optical device 18 may be located in between the housing 12 and the head 20. The optical device 18 includes a body 48 and a transparent barrier 50 connected to the body 48. More particularly, the body 48 defines a planar wall with a cutout and the transparent barrier 50 is disposed within the cutout of the body 48. The transparent barrier 50 may in some embodiments be a simple glass plate with no lensing properties. The transparent barrier 50 may in alternative embodiments function as a lens to direct the light emanating from the light source 14. For example, in an embodiment wherein the transparent barrier 50 functions as a lens, the lens may narrow the light from the light source 14 from approximately 120 degrees down to 60 degrees. The transparent barrier 50 may be substantially parallel to the light source plane LP.

The mounting features 40 of the optical device 18 are located next to the sides of the body 48. The mounting features 40 are in the form of through holes for receiving the mounting features 38 of the housing 12 therethrough. The through holes 40 of the body 48 may or may not be threaded. As assembled, the body 48 of the optical device 18 may be seated within the open front end 32 of the housing 12 such that the top, bottom, and side walls 26, 28, 30 extend at least partially over the body 48. The head 20 is removably connected to the housing 12 by the mounting features 42 of the housing 12. The head 20 is disposed in the open front end 32 of the housing 12. In an embodiment utilizing collimated light, the pattern projected by the gobo 16 will remain in focus, due to the collimated light, even if the entire assembly of the gobo apparatus 10 is moved relative to the surface upon which the pattern is projected and if the gobo 16 is moved axially, rotated, and/or tilted relative to the light source 14.

In such an embodiment, the gobo 16 can be oriented non-perpendicularly to the light source plane LP and/or positioned off-center from the light source axis LA. Alternatively, the gobo 16 can be coaxial with the light source axis LA and oriented non-perpendicularly to the light source plane LP. The gobo 16 can be stationary or movable. For instance, the gobo 16 can be movable, such as rotatable, by the user or by one or more servo motors attached to the housing 12 and the gobo(s) 16 and/or head 20. Additionally, the gobo 16 can be planar, curved, and/or faceted and still project a focused pattern due to the collimated light in an embodiment that uses collimated light.

In use, the user can initially mount the gobo apparatus 10 onto a desired wall or structure. More particularly, the user may attach the handle 34 of the housing 12 onto the wall or other structure. For instance, the gobo(s) 16 may be used to project the focused pattern, e.g. lettering, onto a floor or pathway.

Figure 4:
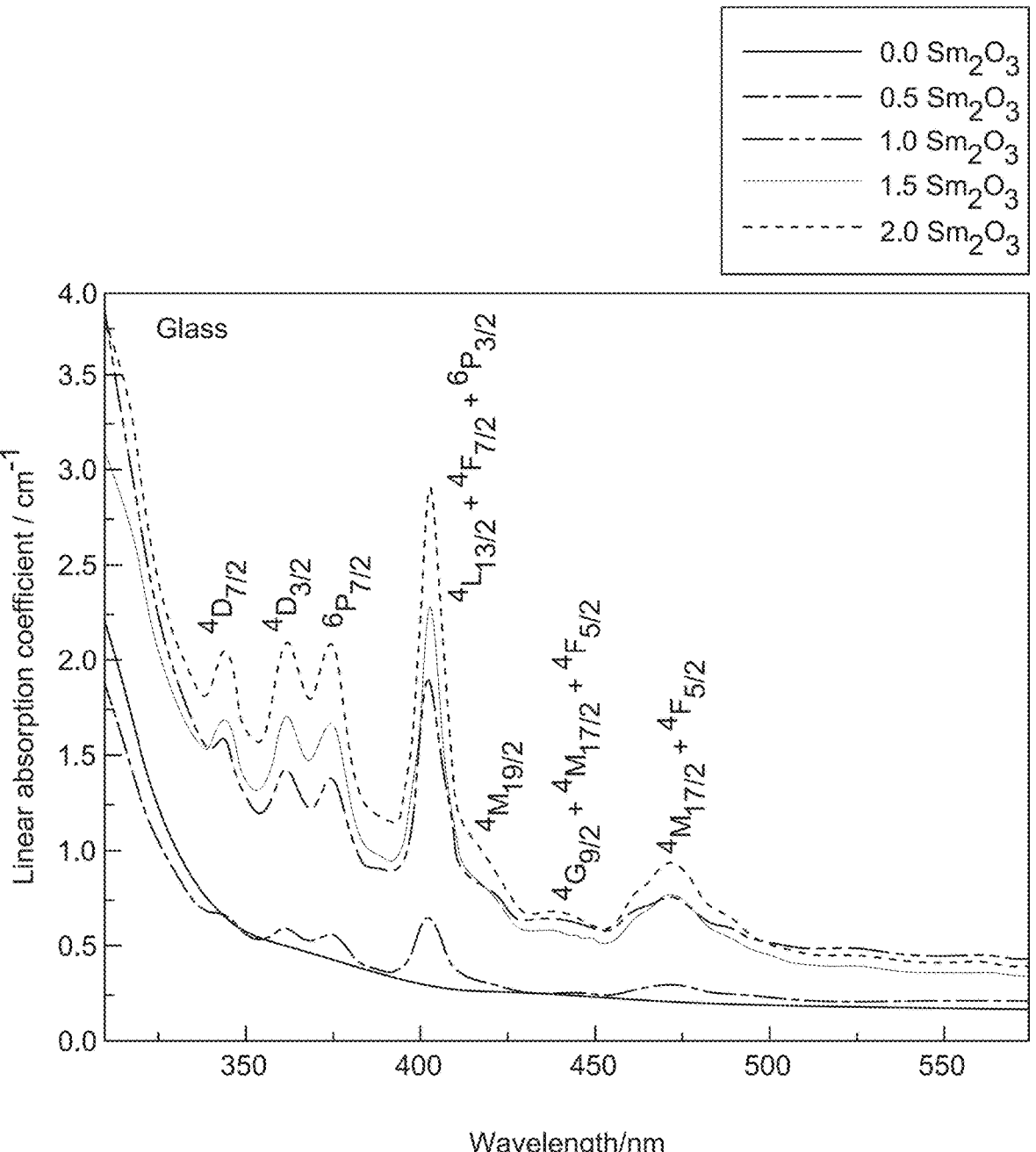
FIG. 4 is a graph showing linear absorption coefficient per cm of glass.
Figure 5:
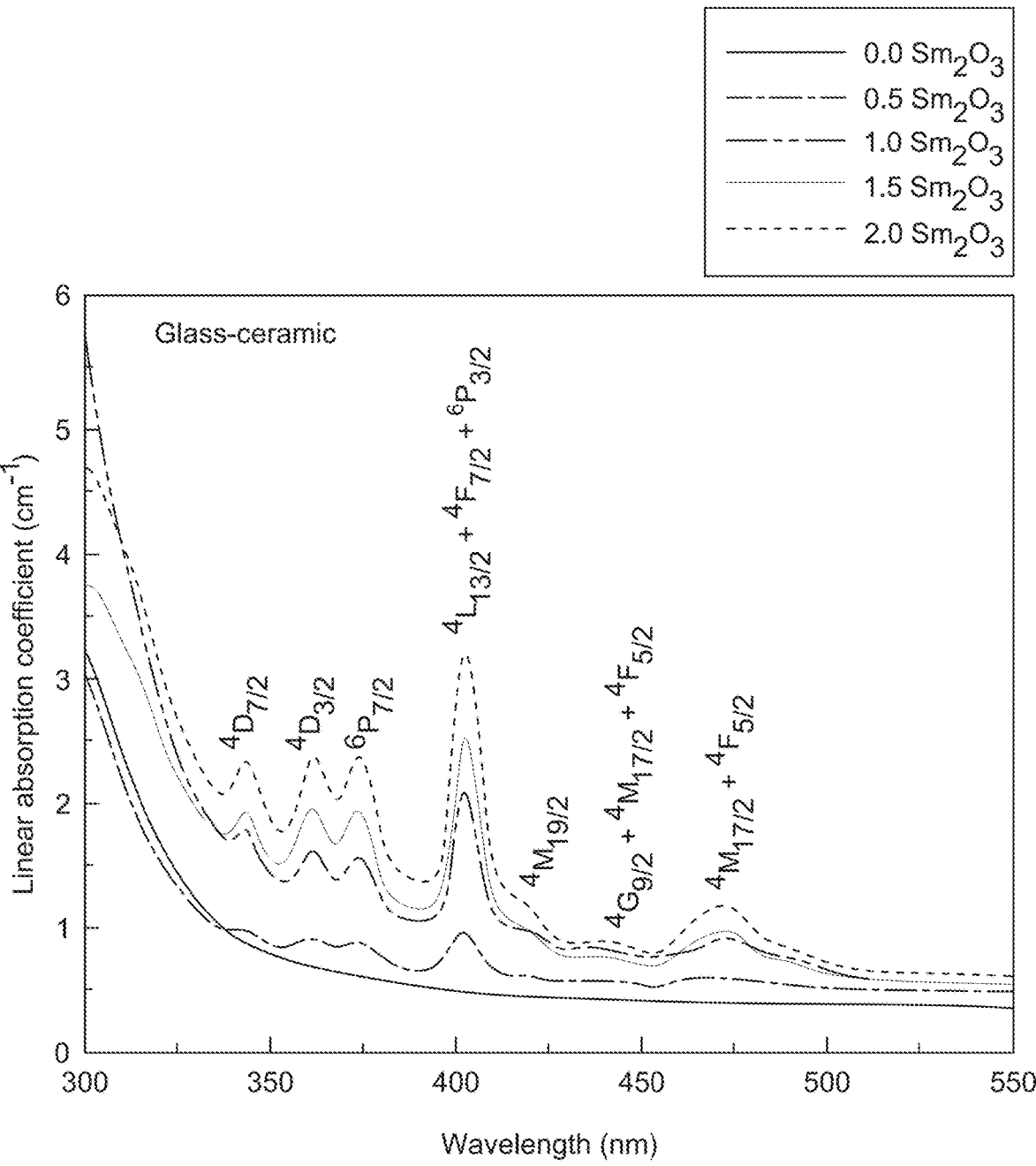
FIG. 5 is a graph showing linear absorption coefficient per cm of glass-ceramic versus wavelength in nm²; and ²*Physical, Structural, Thermal and Spectroscopic Investigation of Sm2O3 doped LAB Glasses for Orange LED*, April 2019 Journal of Luminescence 208, DOI: 10.1016/j.jlumin.2019.01.020, Pravin Pawar, Sudhirkumar Munishwar, Durgaprasad D. Ramteke, Rupesh Gedam

Turning now to FIGS. 4 and 5, reference graphs are shown of the linear absorption coefficient per centimeter versus wavelength in nanometers of 0.0, 0.5, 1.0, 1.5, and 2.0 samarium sesquioxide for glass and glass-ceramic respectively.[3]

Figure 6:
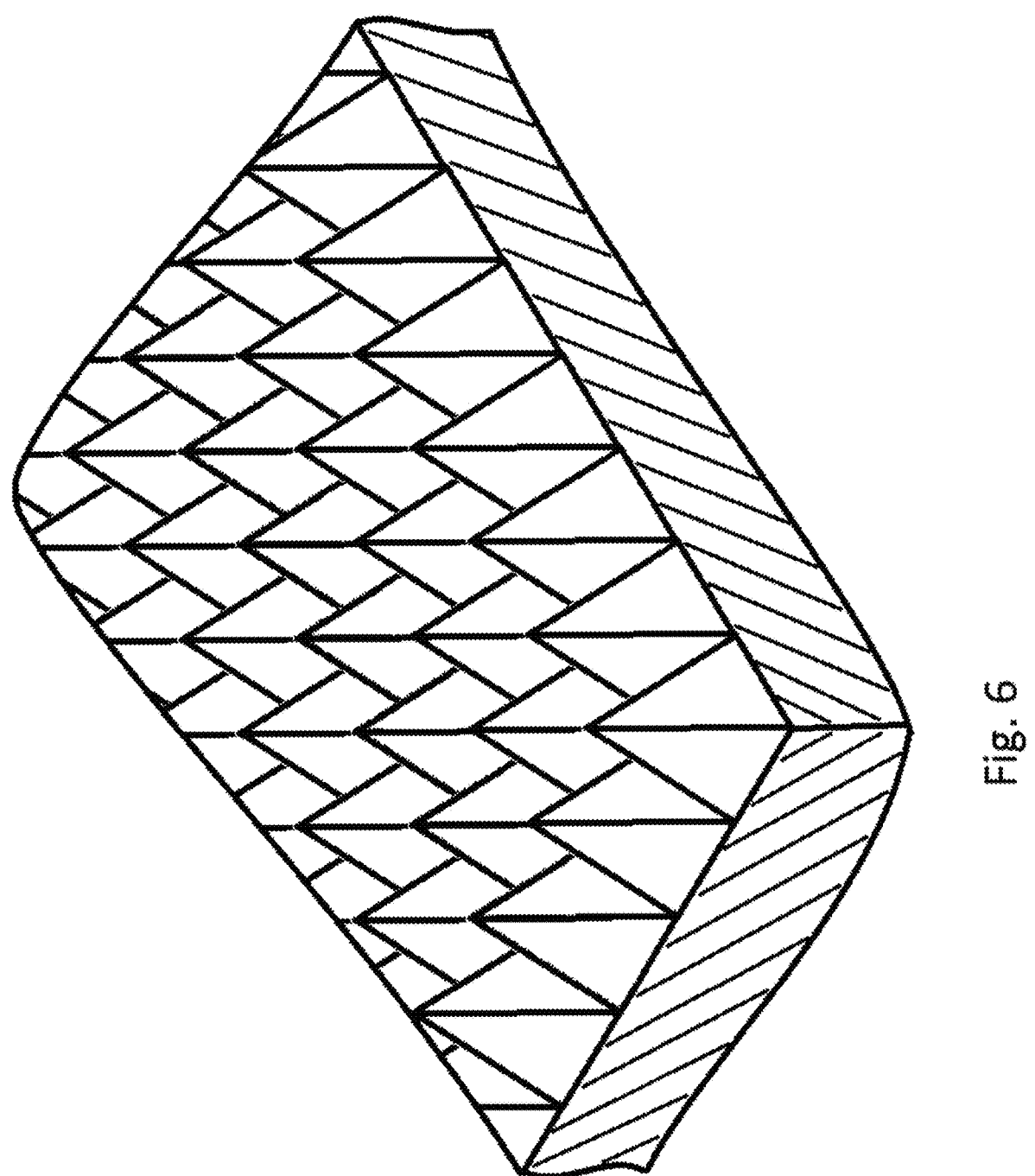
FIG. 6 is a partial perspective view of the glass surface of a gobo having a surface morphology characterized by micro-pyramids that result in micro-lensing created according to the present invention by way of pico-second or femto-second lasers.

[3]*Physical, Structural, Thermal and Spectroscopic Investigation of Sm2O3 doped LAB Glasses for Orange LED,* April 2019 Journal of Luminescence 208, DOI: 10.1016/j.jlumin.2019.01.020, Pravin Pawar, Sudhirkumar Munishwar, Durgaprasad D. Ramteke, Rupesh Gedam FIG. 6 shows surface morphology upon the glass surface of a gobo 16 characterized by micro-pyramids 52 according to the present invention. The surface morphology characterized by micro-pyramids 52 has been created using a pico-second or femto-second laser and result in micro-lensing when in use, thereby rendering the portion of the gobo 16 so etched or frosted in this way fully opaque to light transmission in both directions, as noted previously.

While illustrative arrangements of the invention have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

REFERENCE CHARACTER LISTING

10 gobo apparatus
12 housing
14 light source
16 gobo
18 optical device=lens & body
20 Head w/gobo 16
22 internal frame of housing
24 back wall of housing
26 top wall of housing
28 bottom wall of housing

30 side walls of housing
32 open front end of housing
34 Handle
36 power cable
38 housing mounting features (in general)
40 optical device mounting features
42 head mounting features/slots
44 stems receiving fasteners
46 fasteners
48 body of optical device
50 transparent barrier of optical device
52 surface morphology upon the glass surface of a gobo characterized by micro-pyramids

What is claimed is:

1. A gobo used to project an image by selectively transmitting and blocking light, comprising:
    a blank made of transparent material; and
    a fully opaque etched or frosted area on a surface of the blank having a surface morphology characterized by micro-pyramids.

2. The gobo of claim 1, wherein:
    the fully opaque etched or frosted area having a surface morphology characterized by micro-pyramids being produced using a pico-second or femto-second laser.

3. The gobo of claim 2, wherein:
    the micro-pyramids causing micro-lensing to occur when the gobo is in use.

4. The gobo of claim 2, wherein:
    the transparent material is glass.

5. The gobo of claim 2, wherein:
    the fully opaque etched or frosted area on a surface of the blank having a surface morphology characterized by micro-pyramids further comprises at least one fully opaque etched or frosted area on each side of the blank made of transparent material.

6. A gobo apparatus, comprising:
    a housing;
    a light source disposed within the housing; and
    a gobo used to project an image by selectively transmitting and blocking the light produced by the light source, the gobo comprising:
    a blank made of transparent material; and
    a fully opaque etched or frosted area on a surface of the blank having a surface morphology characterized by micro-pyramids.

7. The gobo apparatus of claim 6, wherein:
    the fully opaque etched or frosted area having a surface morphology characterized by micro-pyramids being produced using a pico-second or femto-second laser.

8. The gobo apparatus of claim 7, wherein:
    the micro-pyramids causing micro-lensing to occur when the gobo is in use.

9. The gobo apparatus of claim 7, wherein:
    the transparent material is glass.

10. The gobo apparatus of claim 7, wherein:
    the fully opaque etched or frosted area on a surface of the blank having a surface morphology characterized by micro-pyramids further comprises at least one fully opaque etched or frosted area on each side of the blank made of transparent material.

11. The gobo apparatus of claim 7, further comprising:
    at least one additional gobo being a colored gobo.

12. The gobo apparatus of claim 7, wherein:
    the light source produces collimated light.

13. The gobo apparatus of claim 7, wherein:
    the collimated light source defining a light source axis and a light source plane; and the gobo is oriented non-perpendicularly to the light source axis.

14. The gobo apparatus of claim 13, wherein:

the gobo is configured to project a focused pattern when the collimated light passes therethrough irrespective of an axial distance between the collimated light source and the gobo, a position of the gobo relative to the light source axis, and an orientation of the gobo relative to the light source plane.

15. The gobo apparatus of claim 14, wherein:

the gobo is positioned off-center from the light source axis.

16. A method of manufacturing a gobo used to project an image by selectively transmitting and blocking light, comprising the steps of:

providing a blank made of transparent material; and etching or frosting an area on a surface of the blank, thereby producing a surface morphology characterized by micro-pyramids that is fully opaque.

17. The method of claim 16, further comprising the steps of:

using a pico-second or femto-second laser to produce the fully opaque etched or frosted area having a surface morphology characterized by micro-pyramids.

18. The method of claim 17, wherein:

the micro-pyramids causing micro-lensing to occur when the gobo is in use.

19. The method of claim 17, wherein:

the transparent material is glass.

20. The method of claim 17, further comprising the step of:

etching or frosting an area on each side of the blank, thereby producing a surface morphology characterized by micro-pyramids in each area that is fully opaque.

* * * * *